(No Model.)

E. W. RATHBUN.
KILN FOR MAKING CHARCOAL.

No. 413,306. Patented Oct. 22, 1889.

WITNESSES.
A. Fraser
Kate Fraser

INVENTOR.
Edward W. Rathbun
per Geo. C. Robb
Attorney.

UNITED STATES PATENT OFFICE.

EDWARD WILKES RATHBUN, OF DESERONTO, ONTARIO, CANADA.

KILN FOR MAKING CHARCOAL.

SPECIFICATION forming part of Letters Patent No. 413,306, dated October 22, 1889.

Application filed March 22, 1887. Serial No. 231,940. (No model.) Patented in Canada April 2, 1887, No. 26,365.

*To all whom it may concern:*

Be it known that I, EDWARD WILKES RATHBUN, lumber merchant, a subject of the Queen of Great Britain, and residing in the village of Deseronto, in the county of Hastings, in the Province of Ontario, Canada, have invented certain new and useful Improvements in Kilns for Making Charcoal, (for which I have received Letters Patent in Canada, No. 26,365, April 2, 1887;) and I do hereby declare that the following is a full, clear, and exact description of the same, reference being made to the accompanying drawings, in which—

Figure 1:
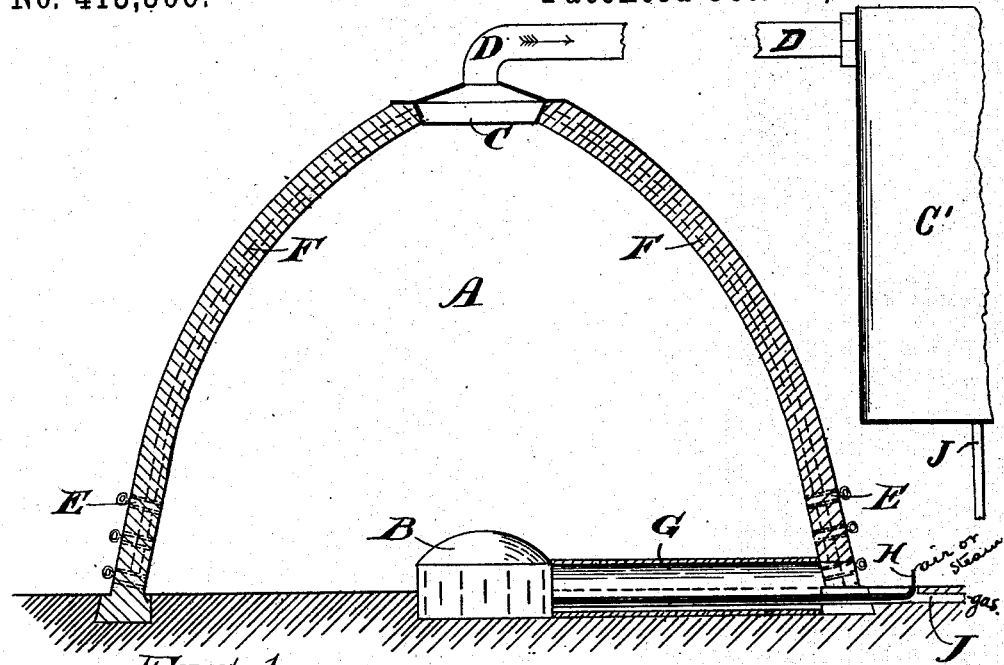
Figure 2:
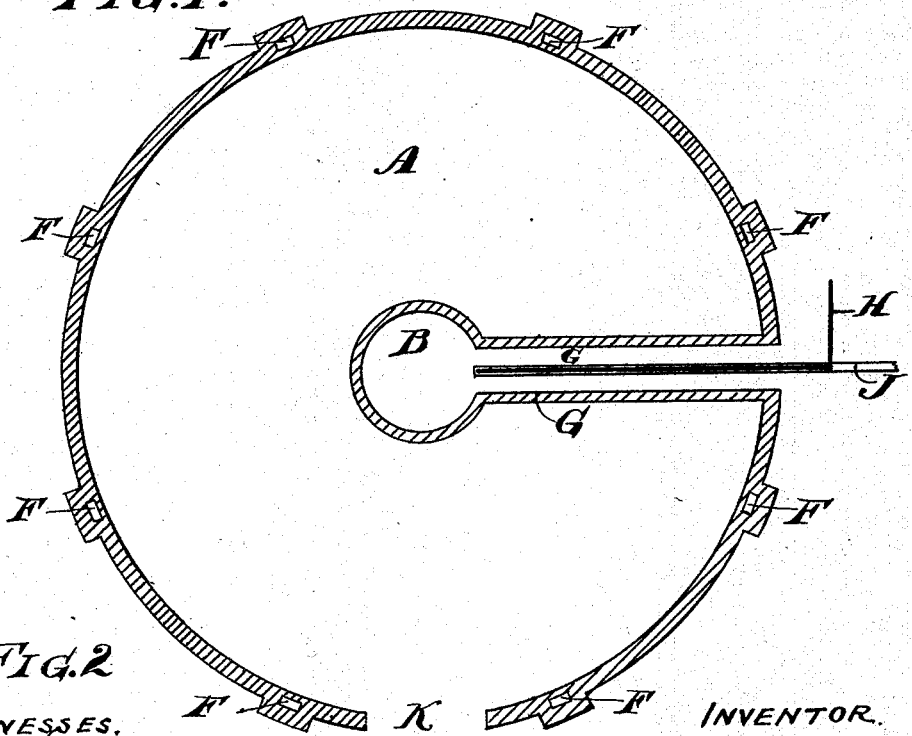

Figure 1 is a sectional elevation of my improved kiln, and Fig. 2 is a sectional ground plan of the same.

The invention consists in kilns for making charcoal, constructed in such manner that the gases evolved during the operation may be drawn off and utilized and at same time give facilities for regulating the draft and controlling the combustion within the kiln, so as to thoroughly and completely char the contents.

In Figs. 1 and 2, A represents the kiln, which by preference is built in the form shown, with the wall of brick or other suitable building material capable of withstanding the action of heat.

F are flues arranged in the wall of the kiln, and have lateral branches at the bottom and extending into the coke-chamber at different height from the floor thereof, so that the evolved gases can be drawn from any desired place above the level of the floor. These branch flues F are provided with valves E to control and regulate the flow of gas from the chamber into the flues. The upper ends of the flue F open into the chamber C, which receives the gases and passes them to a pipe D, leading to a condenser C'. These valves may be placed at various heights from the bottom of the kiln and at intervals throughout its circumference.

B is a chamber with perforated walls built up from the floor of the kiln, and having a passage G leading into it, by which means chamber B may be entered while the charring operation is going on and through which air may be admitted.

J is a pipe to convey gas back from the condenser to the chamber B.

H is a pipe connected to J, and through which air may be blown from a fan in such manner as to form a jet of air and gas discharging into chamber B; or H may be used to inject steam, so as to discharge into B a jet of gas and steam.

K is the opening into the kiln, and which during the charring process is closed either by means of iron doors or by a temporary brick wall.

The following is the method of operating the kiln. By means of the door K the kiln may be filled with wood or other material to be charred. The door is then closed or built up and fire lighted in the chamber B or the passage G. A draft is obtained from the chamber B through the kiln into the chamber C by means of the flues F F F, &c. The direction and amount of the current through the kiln are directed and regulated by the valves E E E, which may be shut entirely or opened to any degree required. From the chamber C the pipe D leads the gases to a condensing apparatus or to any required point. By means of pipe J the gas may be returned or a portion of it may be returned to chamber B along with a jet of air or air and steam, and so promote combustion in that chamber or in the passage G.

I am aware that charcoal-kilns have been provided with means for taking out the gases and conveying them to a condenser, from which they are returned to the combustion-chamber of the kiln, and that I do not broadly claim. My device differs from those above referred to in the fact that the flues from the kiln have several openings, one above the other, near the bottom of the kiln, and provided with means for regulating the flow of gases into said flues, which are formed in the walls of the kiln and extend upwardly, and are connected with a chamber C, which is more or less heated by the kiln. This heating of the gases in chamber C accelerates their flow from the charcoal-forming chamber and aids the formation of the charcoal by rapidly withdrawing the gases without adding to the draft.

What I claim as my invention, and desire to secure by Letters Patent of the United States, is—

1. In a kiln for making charcoal, in which the gases are conveyed from the kiln to a condenser and then returned to the combustion-chamber of the kiln, the combination of the walls provided with flues beginning near the bottom of the kiln and terminating near the top thereof, a chamber C for receiving the gases from said flues and having a pipe leading to the condenser, the perforated combustion-chamber B, having passage G, and a pipe J, to convey gas from the condenser to the combustion-chamber, substantially as described.

2. In a kiln for making charcoal, in which the gases are conveyed from the kiln to a condenser and then returned to the combustion-chamber of the kiln, the combination of the walls provided with flues beginning near the bottom of the kiln and terminating near the top thereof, and provided with a series of valves near the lower ends, a chamber C for receiving the gases from said flues and having pipe D leading to the condenser, the perforated combustion-chamber B, having passage G, and a pipe J to convey gas from the condenser to the combustion-chamber, substantially as described.

3. In a kiln for making charcoal, in which the gases are conveyed to a condenser and then returned to the combustion-chamber of the kiln, the combination of the walls provided with flues beginning near the bottom of the kiln and terminating near the top thereof, a chamber C for receiving the gases from said flues and having a pipe D leading to the condenser, the perforated combustion-chamber B, having passage G, a pipe J, leading from the condenser to the combustion-chamber, and the pipe H, for the purpose set forth.

Deseronto, Ontario, 1st February, 1887.

EDWARD WILKES RATHBUN.

Witnesses:
WM. R. AYLSWORTH,
F. S. RATHBUN.